March 25, 1930.  E. C. HEGG  1,751,585
MACHINE FOR CUTTING AND WRAPPING MATERIAL
Filed May 10, 1927  7 Sheets-Sheet 1

INVENTOR
EDWARD C. HEGG
BY
ATTORNEYS

March 25, 1930.   E. C. HEGG   1,751,585
MACHINE FOR CUTTING AND WRAPPING MATERIAL
Filed May 10, 1927   7 Sheets-Sheet 2

INVENTOR
EDWARD C. HEGG
BY
ATTORNEYS

March 25, 1930.  E. C. HEGG  1,751,585
MACHINE FOR CUTTING AND WRAPPING MATERIAL
Filed May 10, 1927  7 Sheets-Sheet 3

INVENTOR
EDWARD C. HEGG
BY Popp & Powers
ATTORNEYS

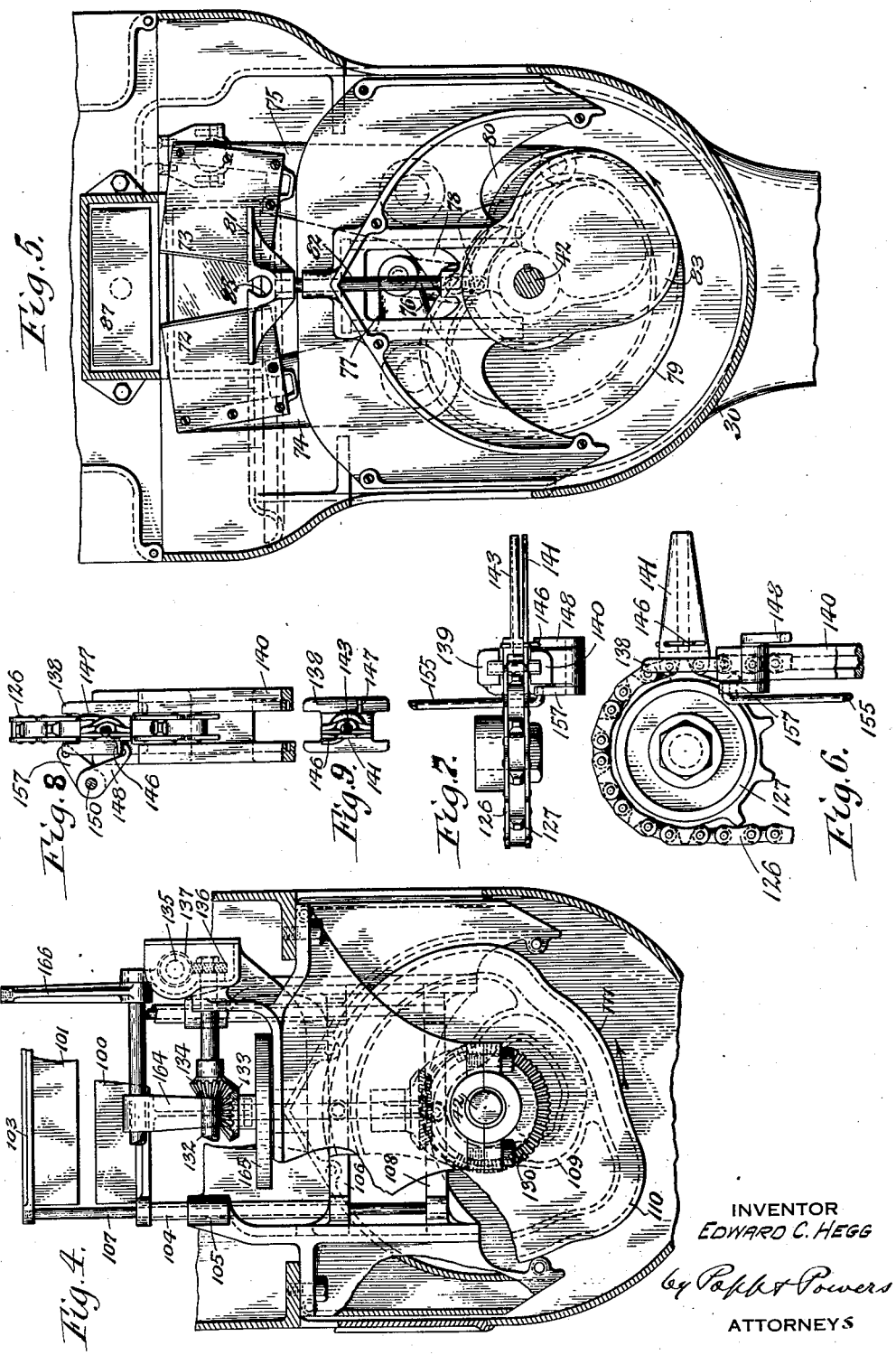

March 25, 1930.  E. C. HEGG  1,751,585
MACHINE FOR CUTTING AND WRAPPING MATERIAL
Filed May 10, 1927  7 Sheets-Sheet 5
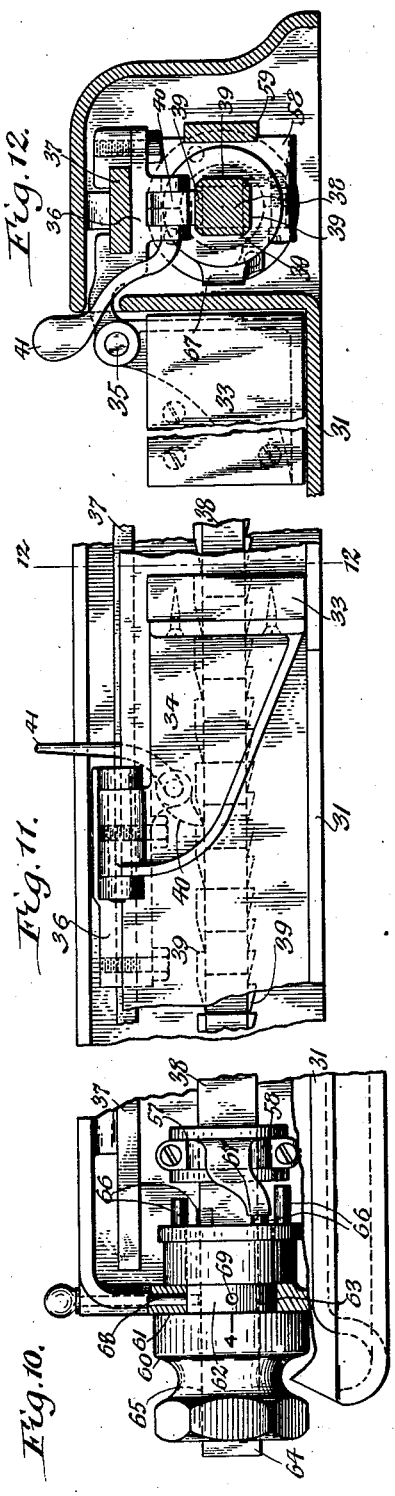
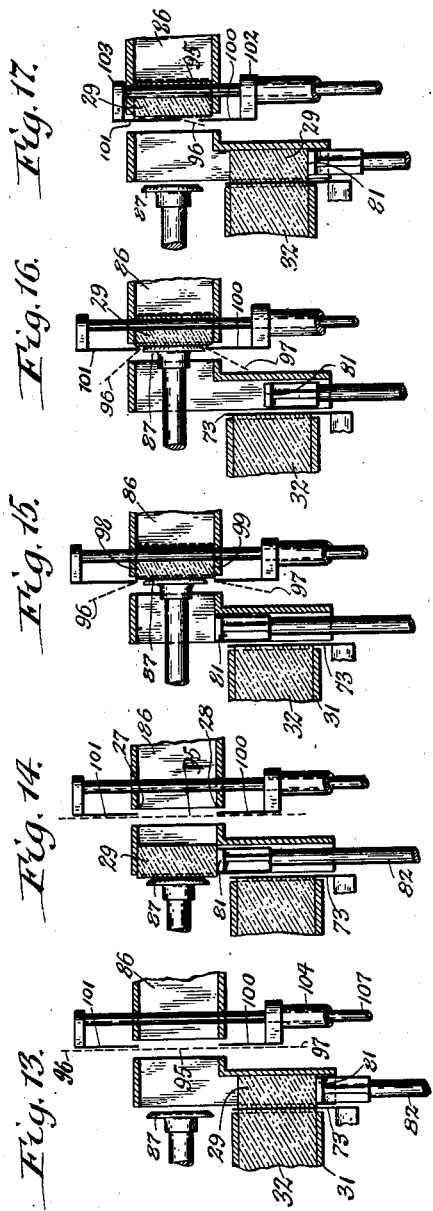
INVENTOR
EDWARD C. HEGG
BY Rolff & Powers
ATTORNEYS

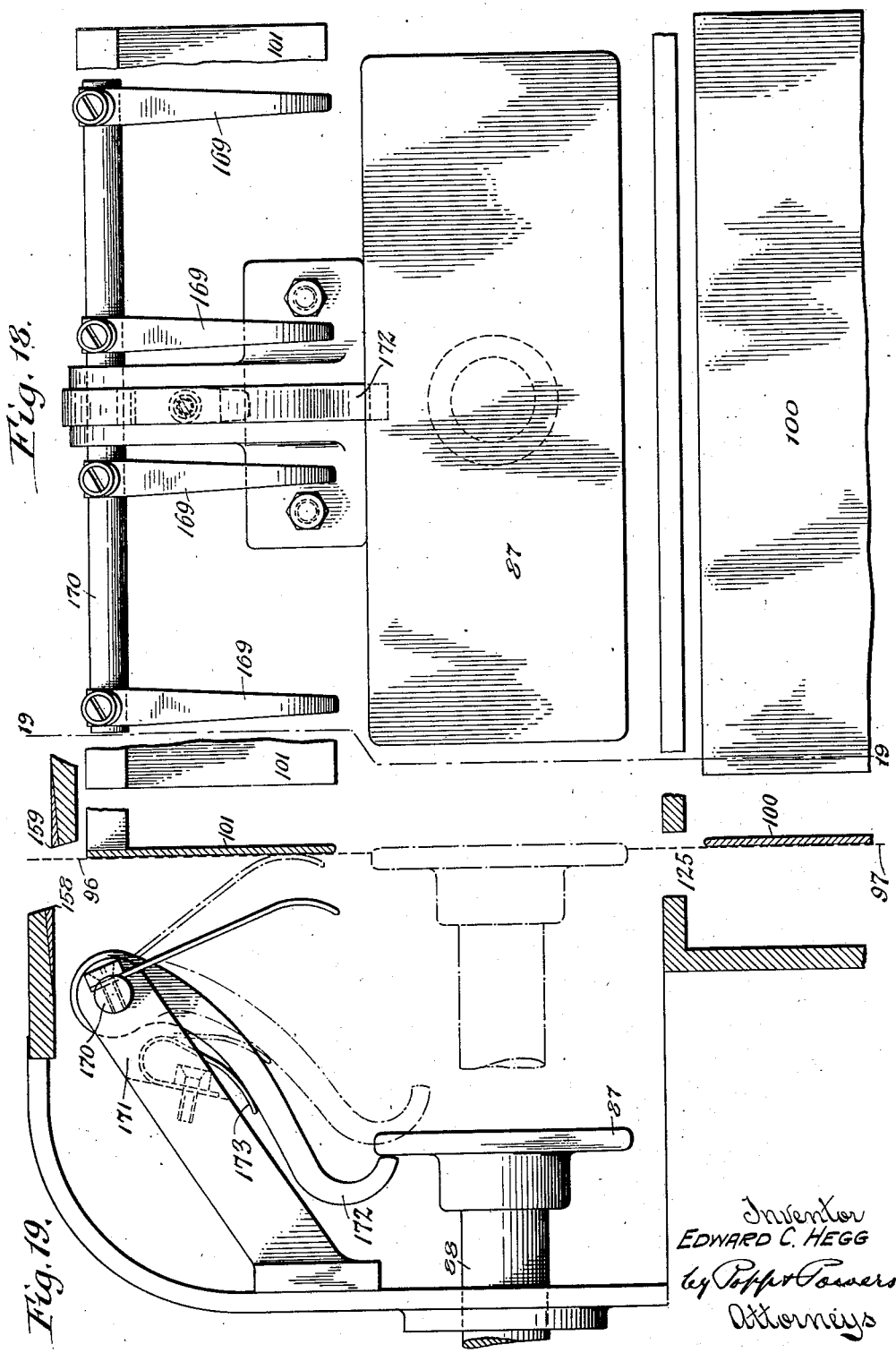

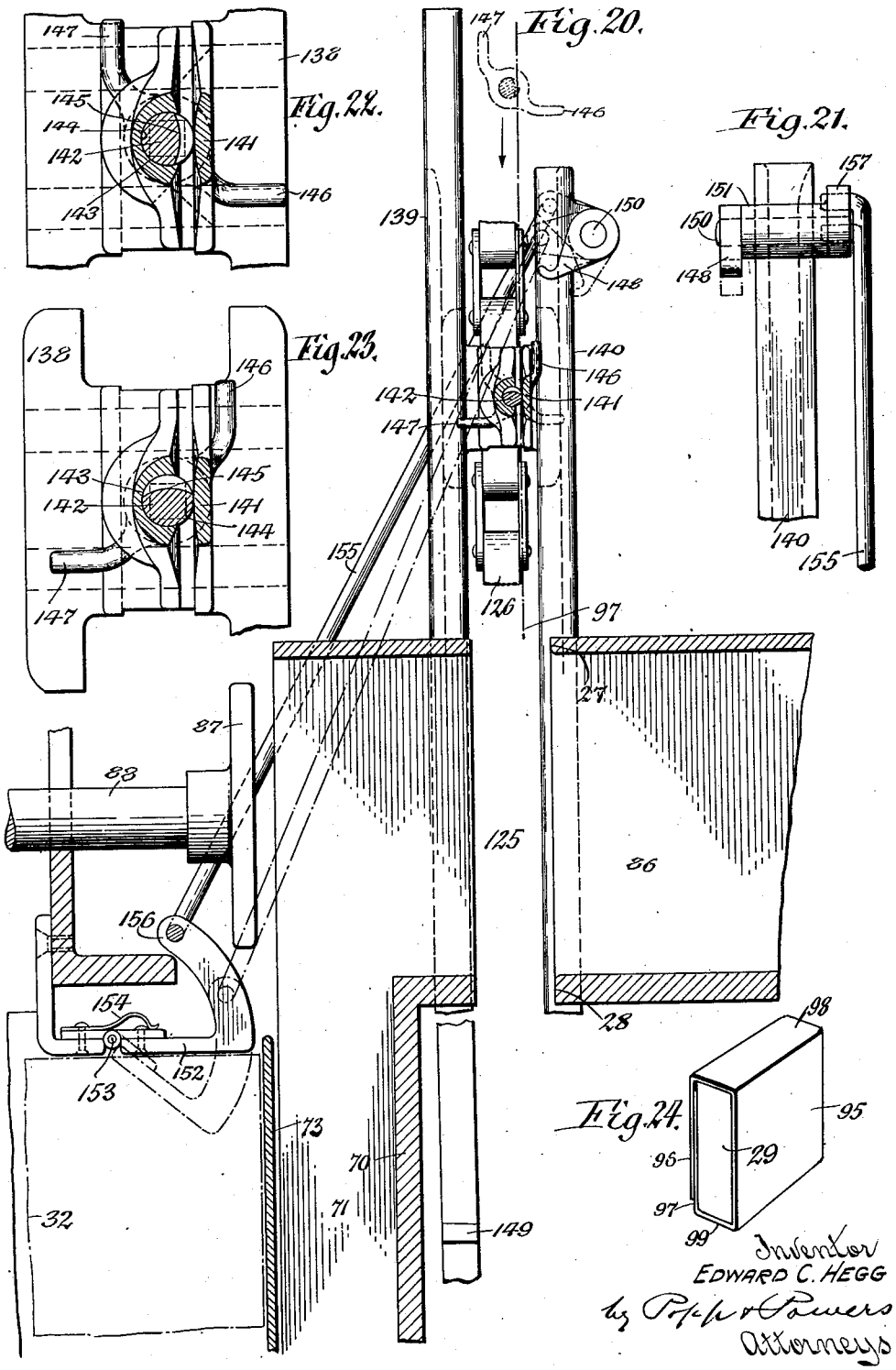

Patented Mar. 25, 1930

1,751,585

UNITED STATES PATENT OFFICE

EDWARD C. HEGG, OF BUFFALO, NEW YORK, ASSIGNOR TO MOJONNIER BROS. CO., A CORPORATION OF ILLINOIS

MACHINE FOR CUTTING AND WRAPPING MATERIAL

Application filed May 10, 1927. Serial No. 190,359.

This invention relates to a machine for cutting a slab or block of material into sections or slices and wrapping the same in paper suitable for sale to the retail trade, and although this machine is primarily designed for cutting ice-cream slabs or blocks in this manner and wrapping them preparatory to turning the same over to customers, it obviously can be used for slicing and wrapping other materials preparatory to dispensing the same.

It is the object of this invention to provide a machine capable of performing these functions which is compact in construction, efficient and economical in operation and capable of handling a comparatively large amount of material conveniently, and expeditiously.

The machine which I have produced includes material cutting, paper feeding and wrapping features. The wrapping features are particularly claimed in the present application. The material cutting features are more particularly claimed in divisional application, Serial No. 256,231, filed February 23, 1928. And the paper feeding features are more particularly claimed in a second divisional application, Serial No. 353,044, filed April 6, 1929.

In the accompanying drawings:—

Figure 4 is a fragmentary view similar to Fig. 3 but showing more particularly the mechanism for wrapping a sheet around the sections of material.

Figure 5 is a vertical transverse section, on an enlarged scale, taken on line 5—5 Fig. 1 and showing more particularly the mechanism whereby the block or slab of material is cut into sections or slices.

Figure 6 is a fragmentary front elevation of one of the grippers and adjacent parts of the paper feeding mechanism on the left side of the machine.

Figure 7 is a top plan view of the same.

Figure 8 is an edge view of the gripper and adjacent part of the left hand paper feeding mechanism, shown in Fig. 6.

Figure 9 is an end view of one of the left hand paper grippers detached from its carrier.

Figure 10 is a fragmentary side elevation partly in section, on an enlarged scale, of the means whereby the mechanism which feeds the block of material to be cut and wrapped, may be adjusted to cut sections or slices of different thicknesses.

Figure 11 is a similar view of the follower and adjacent parts of the mechanism which feeds the block of material.

Figure 12 is a vertical cross section taken on line 12—12 Fig. 11.

Figures 13, 14, 15, 16 and 17 are diagrammatic views illustrating different positions of parts of the mechanism whereby a sheet of paper or similar material is wrapped around a section or slice of material.

Figure 18 is a fragmentary front elevation of the plunger and adjacent parts of the mechanism whereby a sheet of paper is wrapped around a section of the material.

Figure 19 is a fragmentary longitudinal section taken on line 19—19 Fig. 18.

Figure 20 is a fragmentary vertical longitudinal section of the right hand portion of the wrapping mechanism and adjacent parts, on an enlarged scale.

Figure 21 is a front elevation of the closing trip arm on adjacent parts of the paper feed mechanism on the right hand side of the machine which controls the operation of feeding the paper, depending upon whether the block of material has been initially advanced to a predetermined position.

Figure 22 is an end view partly in section, on an enlarged scale, of one of the grippers of the right hand paper feed mechanism showing the same in its open position.

Figure 23 is a similar view showing the gripper in its closed position in which it grips the web of paper which is to be advanced to the wrapping position.

Figure 24 is a perspective view of a cake or slice of material which has been wrapped in the machine forming the subject of this invention.

Similar characters of reference indicate corresponding parts in the several figures of the drawings:—

The numeral 30 represents the main frame of the machine which may be of any suitable construction to support the various working parts of the machine. On the upper part of this frame and at the rear end thereof the same is provided with a horizontal table 31 upon which is adapted to be supported a block or slab of material 32 such as a block of ice-cream, preparatory to cutting the same up into sections and wrapping the sections successfully in sheets of paper. The forward movement of this block of material is effected step by step through the medium of a feed mechanism and means are provided whereby the length of these steps may be varied in order to vary the thickness of the sections or slices 29 in accordance with the demands of the trade or other conditions. This block feeding and adjusting mechanism is constructed as follows:—

The numeral 33 represents a follower which is arranged transversely above the feed table 31 and moved forwardly lengthwise thereof in engagement with the rear end of the block of material for advancing the latter toward the cutting mechanism and also capable of being retracted into its rearmost position for engaging with a new block when the cutting of the preceding block has been completed or nearly completed.

Figure 2:
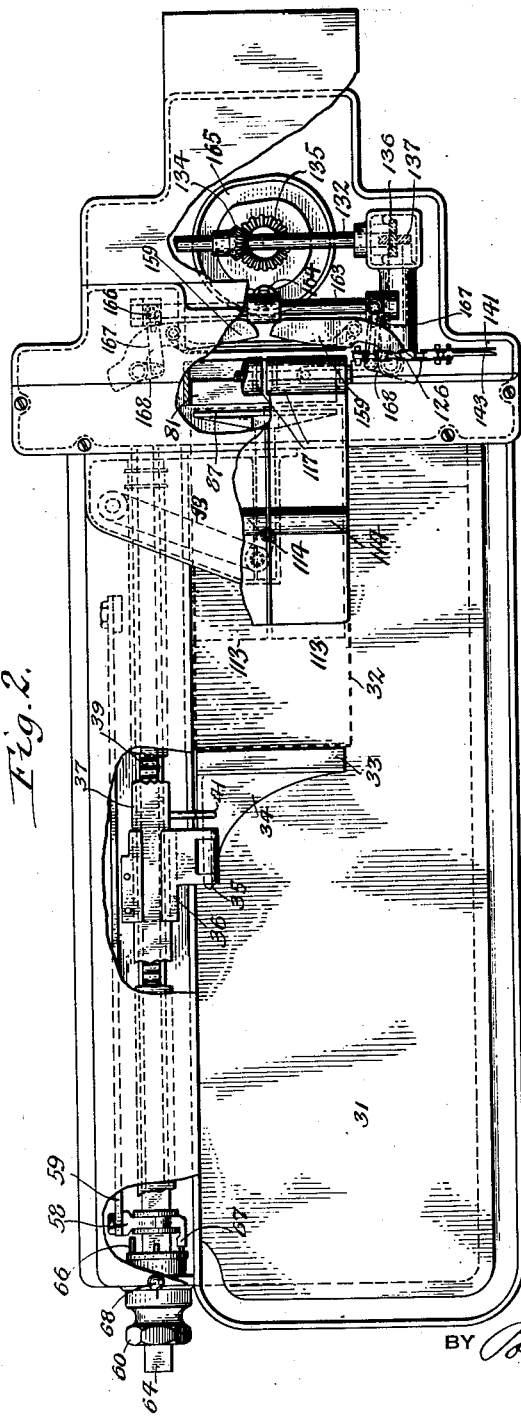
Figure 2 is a top plan view of the same with parts broken away to show the internal mechanism.

This follower 33 is provided with a rearwardly projecting arm 34 which is connected by means of a horizontal longitudinal pin 35 with a carrier 36 sliding horizontally and lengthwise upon a guide bar 37 which is mounted on the main frame adjacent to the rear side of the feed table 31, as best shown in Figs. 2, 11, and 12.

Below the guide bar 37 is arranged a longitudinally reciprocating feed bar 38 which is provided on different parts of its periphery with longitudinal rows of ratchet teeth 39, any row of which may be engaged by a feed pawl 40 which is pivotally mounted on the underside of the carriage 36 and adapted to be moved into and out of engagement with the respective row of teeth on the feed bar 38 by means of handle 41 connected with the pawl. By means of this handle 41 the pawl 40 may be lifted out of engagement from the respective teeth of the feed bar 38 after which the carriage 36 together with the follower 33 may be moved lengthwise of the feed table into any desired position, and after such adjustment the pawl 40 may be again lowered into engagement with the respective teeth of the feed bar 38 so that the movement of the latter will be transmitted to said follower.

This feed bar 38 has a longitudinally reciprocating movement, the strokes of which are of the same length, this movement being preferably derived from a main driving shaft 42 which is journaled horizontally and lengthwise in the lower part of the main frame and is rotated so that it makes one turn for every complete cycle of operations of the machine. Although this driving shaft may be operated in any suitable manner and from any suitable source, it is preferable to drive the same from an electric motor 43 which is mounted on the lower rear part of the main frame.

Figure 1:
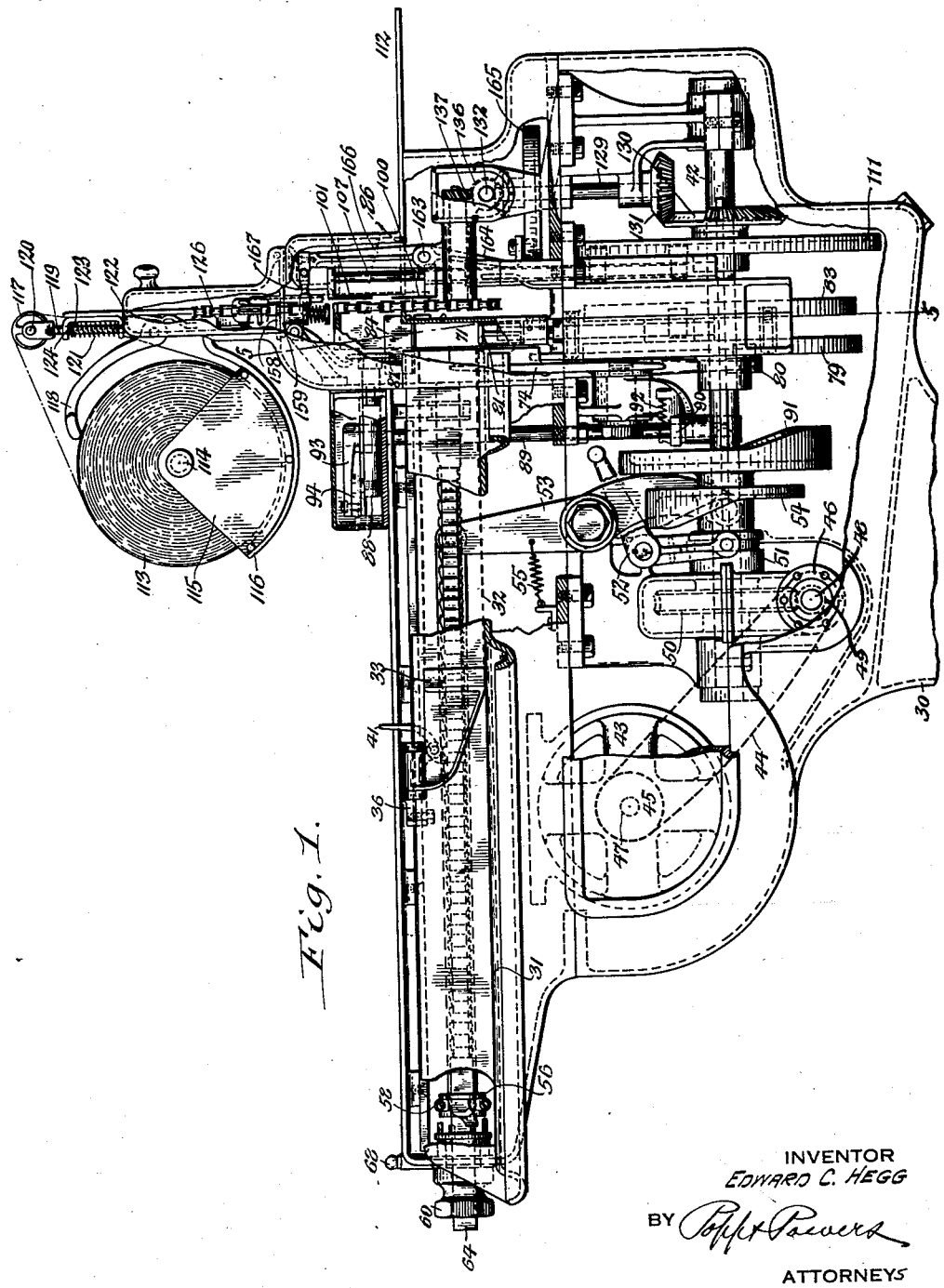
Figure 1 is a side elevation of a cutting and wrapping machine embodying my invention with parts of the enclosure broken away so as to show the internal mechanism.
Figure 3:
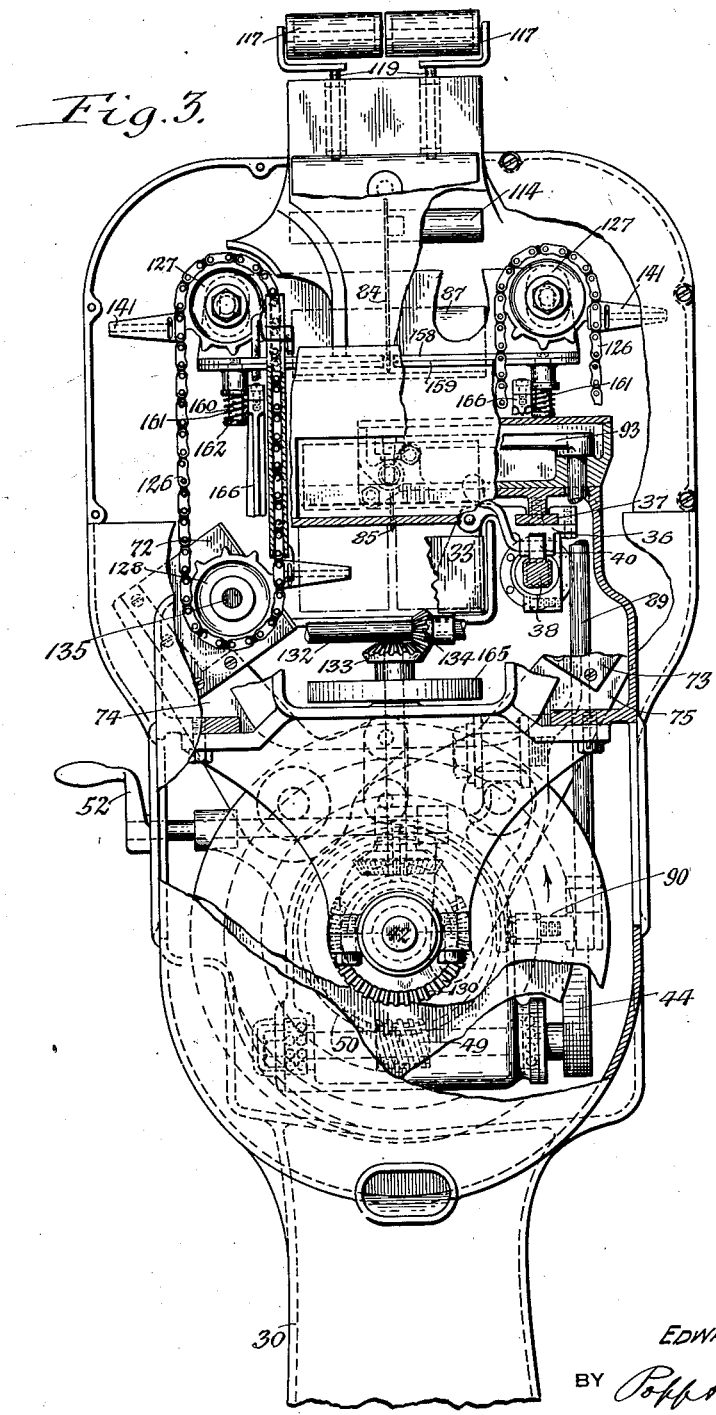
Figure 3 is a front elevation of the same, on an enlarged scale, showing parts broken away and in section for exposing the internal mechanism.

Motion may be transmitted from this motor to the main driving shaft 42 by the driving belt 44 passing around pulleys 45 and 46 which are secured to the shaft 47 of the motor and a countershaft 48 arranged transversely below the main shaft 42, and a worm gearing consisting of a worm pinion 49 secured to the countershaft 48 and meshing with the worm wheel 50 on the main driving shaft, as best shown in Figs. 1 and 3. For the purpose of starting and stopping the machine without interrupting the motion of the motor, a clutch 51 is preferably employed which is interposed between the main driving shaft 42 and the driven worm wheel 50 and which is operated by means of a shifting lever 52, as shown in Fig. 1.

Motion is transmitted from the driving shaft 42 to the feed bar 38 for reciprocating the latter lengthwise by means of an upright rock lever 53 which is pivotally mounted on the main frame and actuated so that its upper arm moves forwardly by means of a cam 54 secured to the driving shaft 42 and engaging with the lower arm of this lever 53, while the return movement of this lever is effected by means of a spring 55 connecting the upper arm thereof with an adjacent stationary part of the main frame, a coupling sleeve 56 secured to the rear end of the feed bar 38 and provided with an annular groove 57, a coupling collar 58 engaging with the groove 57, and a link 59 connecting the collar 58 with the upper arm of the rock lever 53. By this means a longitudinal reciprocating movement having strokes of equal length is imparted to the feed bar 38 by motion derived from the driving shaft 42. The point at which the forward movement of the feed bar terminates is always the same but the point at which its rearward movement is arrested may be varied for the purpose of adjusting the effective stroke of the feed bar and the forward step of the follower 33, in accordance with the desired thickness of the section or slice which is to be cut off from the front or advancing end of the slab of material. For this purpose an adjustable stop device is provided which preferably is constructed as follows:—

The numeral 60 represents an adjusting sleeve which is rotatably mounted on the main frame at the rear end of the feed table 31 but held against longitudinal movement by engaging a groove 61 formed by a reduced neck 62 on the sleeve with an opening 63 in the adjacent part of the frame, as shown in Fig. 10. This adjusting sleeve and the rear end of the feed bar 38 are connected with each other in such manner that the same are compelled to turn together, but the feed bar is capable of longitudinal movement in the adjusting sleeve.

In its preferred form this connection is effected by making the rear end of the feed bar 38 square, as shown at 64, and engaging the same with a correspondingly shaped bore 65 of this adjusting sleeve. On its front side this adjusting sleeve is provided with a plurality of stops 66 which are arranged in an annular row about the axis of this sleeve and are made of different heights so that the distance from the front ends of these stops to the further extremity of the stroke of the feed bar varies accordingly. On the coupling collar 58 is arranged a stop arm 67 which projects rearwardly therefrom and is adapted to engage with one or another of the series of stops 66 on the adjusting sleeve 60, depending upon which of these stops is arranged in line with this stop arm. Upon turning the adjusting sleeve 60 so that the shortest or lowest stop 66 is arranged in line with the stop arm 67, then the feed bar is permitted to effect its longest backward stroke and consequently its longest forward stroke so that a slice or section of maximum thickness will be cut off from the front or advancing end of the material inasmuch as the shortest stop 66 in this position will permit the feed bar to move backwardly until the stop arm 67 engages with this shortest stop. If the adjusting sleeve is turned so that the longest stop 66 is brought in line with a stop arm 67, then the latter upon engaging with the longest stop 66 will arrest the backward movement of the feed bar 38 at a point which determines the shortest backward stroke and subsequently effects the shortest forward throw whereby the block of material will be fed forward a distance equal to the shortest step, and a slice or section of minimum thickness will be cut off from the front end of the block.

In like manner the adjusting sleeve 60 may be turned for bringing either of the intermediate stops in line with the stop arm 67 and thereby vary the feeding action upon the block of material and the thickness of the slice or section which is cut therefrom accordingly. In order to hold the adjusting sleeve in any of the various positions in which it presents one or another of the stops 66 to the stop arm 67, a locking pin 68 is provided which moves vertically in the adjacent part of the frame and may be engaged or disengaged with one or another of a series of openings 69 formed at different points in the circumference of the neck of the adjusting sleeve corresponding to the positions of the several stops 66 relative to the stop arm 67.

As the feed bar 38 is turned for the purpose of varying the stroke of the same the rows of teeth arranged on the periphery thereof are also shifted circumferentially in order to engage one or another of these rows of teeth with the feed pawl 40. In the preferred construction the length of the teeth in these several rows varies in accordance with the length of the stroke of the feed bar, corresponding to the particular back stop 66 which is engaged by the stop arm 67, the teeth which are arranged in operative relation to the pawl 40 being longest when the shortest stop 66 is presented to the stop arm 67, as shown in Fig. 10 and at the top of Fig. 11, and proportionately shorter feed teeth being employed in the remaining rows on the feed bar as shown for example on the lower side of the feed bar in Fig. 11.

As the block of material reaches the end of each step during its forward feeding movement the front end of this block projects beyond the front end of the table 31 and either engages with or is close to an upright front wall or stop 70 which latter is separated from the front edge of the table 31 by an intervening space which forms a vertical well 71. After the block of material has been thus advanced so that its front end projects beyond the front end of the feed table 31, this projecting part of the block is operated upon by a cutter-mechanism for severing a section or slice of material from the block. This cutter mechanism may be variously organized but in its preferred form the same comprises two cutter blades 72, 73 which are arranged vertically and are adapted to move transversely toward and from each other across the path of the block of material so that in the closed position of these cutters the opposing upright edges of the same practically meet at the center of the path of material, while in the open position of the blades the same are retracted laterally from opposite sides of this path so as to not obstruct the same and permit of feeding the block forwardly.

As best shown in Fig. 5 the cutter 72 is mounted on the upper arm 74 of an elbow lever which is pivoted on the main frame by a horizontal longitudinal pivot and the cutter 73 is secured to the upper arm 75 of a three-armed lever which is pivoted by a horizontal longitudinal pivot to the main frame. These levers are caused to move in unison so that their cutter blades approach the center of the path of the block and move away from the same at the same time by a link 76 connecting the inwardly projecting lower arm 77 of the lever supporting the left hand blade 72 with an inwardly projecting central arm 78 of the lever supporting the right hand blade 73, and a rotary cam 79 secured to the driving shaft 42 and engaging with the lower arm 80 of the lever supporting the right hand blade 73 as best shown in Figs. 1, 3 and 5.

After a section or slice has been cut off from the front end of the block, the same is shifted to the mechanism which operates to wrap a sheet of paper around the same. This mechanism in the preferred construction comprises an elevator 81 which is normally lowered in the well 71 with its upper side substantially flush with the top of the feed table 31 so that the block of ice-cream or other material when advanced, will project with its foremost portion over the upper side of the elevator 81, then the latter is raised so as to lift the foremost part of the block of material which has been severed in the form of a slice or cake from the remainder of the block until this section is arranged above the body of the material and horizontally in line with the device which operates to wrap a sheet of paper around this section. This elevator is raised and lowered in proper timing with the movements of the section cutter and block feeder and this is preferably accomplished by mounting this elevator on the upper end of a lifting rod 82 which is suitably guided on the main frame and engages its lower end with a lifting cam 83 which is mounted on the driving shaft 42 so as to be rotated thereby.

In Fig. 13 this elevator is shown in its lowermost position which it occupies while the block of material is being fed over the same, and in Fig. 14 this elevator is represented in its highest position which it assumes when the section of material severed from the body of the same has been elevated in proper position to be acted upon by the wrapping mechanism.

In the manufacture of ice-cream or similar material in the form of blocks or slabs, the cross section of the same is usually of oblong form and of twice the area in which ice cream or similar material is usually sold in brick form. It is therefore proposed in the present machine to again divide the sections which are removed from the block of material into two smaller cakes or slices of equal size. To accomplish this without involving the use of any additional movable parts, a dividing blade 84 is provided which is arranged in an upright and longitudinal position above the well 71 and mounted on the adjacent part of the main frame so that when the section of material removed from the main block is lifted, this section will be engaged with this dividing blade 84 and cut thereby into two cakes or slices of equal dimensions by the time the section has been elevated into its highest position by the elevator.

In order to prevent the lower edge of this dividing blade from being injured or interfering with the operation of the elevator the central part of the latter is provided with a longitudinal notch or recess 85 as shown in Fig. 5, which receives the lower edge of the dividing blade 84 and enables the latter to effect a clean cut or division between the two smaller cakes or slices of material which have been elevated preparatory to wrapping them in paper.

After a section of material has been thus elevated and divided into two smaller cakes or slices, the same are acted upon by a wrapping mechanism which operates to wrap sheets of paper individually around the cakes or slices of material so as to cover the upper and lower edges and the front and rear flat sides of each cake or slice, leaving the side edges exposed.

In the main, this wrapping mechanism is duplicated, the main parts of each mechanism serving to wrap one cake or slice of a pair and the following description, in the main, will therefore apply to the two sections of this wrapping mechanism whereby two slices or cakes of material are wrapped at the same time:—

The numeral 86 represents a tubular receiver which is arranged horizontally and lengthwise immediately in rear of the place where the two cakes or slices of material come to rest when the elevator reaches the upper end of its stroke and which is adapted to receive these two slices by having the latter moved rearwardly into the same. This rearward movement of these two slices or cakes of material is effected by means of a longitudinally and horizontally movable plunger 87 which is mounted on the front end of a plunger rod 88 which is guided in suitable guideways on the upper part of the main frame and which is reciprocated in proper synchronism with the other parts of the machine by motion derived from the driving shaft 42. The particular mechanism whereby motion is transmitted from this driving shaft to the plunger rod 88 which is shown in the drawings, comprises an upright rock shaft 89 journaled in suitable bearings on the main frame and provided at its lower end with a rock arm 90 which engages with a cam 91 on the driving shaft 42, a spring 92 which holds the rock arm 90 yieldingly in engagement with the cam, an upper rock arm 93 arranged on the upper end of the rock shaft 89 and a link 94 connecting the upper rock arm 93 with the plunger rod 88, as best shown in Figs. 1, 2 and 3. While the section of material is being lifted by the elevator 81 and cut into two smaller cakes or slices the plunger 87 is retracted rearwardly out of the path of the slices to be wrapped as shown in Fig. 13, and after these slices have reached their uppermost position, as shown in Fig. 14, the plunger is moved forwardly and pushes the slices of material from the top of the elevator into the receiver 86, as shown in Fig. 15.

Preparatory to moving each cake or slice of material from the upper end of the elevator into the receiver 86 a sheet of paper is fed downwardly so that the central part 95 of this sheet is arranged opposite the inlet of this receiver and the upper and lower ends 96 and 97 of this sheet are arranged above and below the inlet of the receiver, as shown in Fig. 13. As each cake or slice of material is pushed from the elevator into the receiver the flat front side of the slice engages with the central part 95 of the sheet of paper and as this cake or slice and the sheet of paper are pushed together forwardly into the receiver the upper and lower parts of the sheet immediately adjacent to the central part 95 thereof are bent horizontally rearwardly against the upper and lower edges of the cake of material by the rear edges 27, 28 of the top and bottom of the receiver 86, as shown at 98 and 99 in Figs. 15, 16, 17 and 24.

After the slice of material has been thus pushed into the receiver 86 and while the plunger 87 is still in engagement with the rear side of the slice, a lower folding blade 100 first rises into engagement with the lower part of the sheet immediately adjacent to the lower rear corner of the slice and produces a short crimp in the same, and an upper folding blade 101 descends and engages with the upper part of the sheet immediately adjacent to the upper rear corner of the slice and also produces a short crimp in this part of the sheet, as shown in Fig. 16, thereby serving as retainers whereby the partly wrapped slice of material is held in the receiver 86 and the plunger 87 is permitted to withdraw rearwardly out of engagement from the rear side of the slice of material without liability of pulling this slice backwardly with the plunger as would be liable to occur owing to the adhesion which was produced between the same while the plunger moved the slices of material forwardly into the receiver. After the plunger has been thus withdrawn rearwardly away from the rear side of the slice of material, the lower folding blade 100 completes its upward movement and bends the lower end 97 of the sheet in the form of a flap against the rear side of the slice of material, as shown in Fig. 17 and then the upper folding blade 101 also completes its downward movement and bends or folds the upper end 96 of the sheet downwardly against the rear side of the slice of material, as shown in Fig. 17. Thereafter the lower folding blade is moved downwardly and the upper folding blade 101 is raised out of the path of the slice and the plunger as the next slice is moved from the elevator into the receiver.

Various means may be employed for obtaining this particular action of the folding blades, those shown in the drawings being suitable and comprising a lower cross-head 102 which carries the lower blade, an upper cross-head 103 which carries the upper folding blade, two upright tubular shifting rods 104 connected with opposite ends of the lower cross-head 102 and guided in guide-ways 105 on the main frame, a lower cross-head 106 connected to the lower ends of the tubular rods 104, upright guide rods 107 sliding in the tubular rods 104 and connected at their upper ends with the upper cross-head 103, a lower cross head 108 connected with the lower ends of the guide rods 107, and two cams 109, 110 formed on a disk 111 which is secured to the driving shaft 42 and engaging with the lower cross-heads 108 and 106 respectively, as shown in Fig. 4. As the cams 109 and 110 rotate with the driving shaft, the lower and upper folding blades are moved vertically toward and from each other across the rear or inlet end of the receiver 86 and produce the holding action on the sheet of paper for wrapping the same around a slice or cake of material in the manner which is described.

As each succeeding slice or piece of material is pushed forwardly from the elevator into the receiver and wrapped in a sheet of paper the same engages with the previously wrapped slice of material and pushes the latter forwardly upon a delivery table 112 on which the several wrapped slices of material accumulate in a row preparatory to being removed and dispensed to the trade or placed in a refrigerator or other container ready for distribution.

The mechanism whereby sheets of paper are supplied for wrapping the pairs of slices of material at the same time may be varied in construction, but as shown in the drawings the same are preferably constructed as follows:—

The paper for the two slices of material is supplied from two rolls 113 which are arranged axially in line and side by side above the plunger 87 and its actuating mechanism and mounted to turn loosely on arbors 114 which project from opposite sides of an upright plate 115 which is carried by a bracket 116 secured to the adjacent part of the main frame. The web of paper is unwound from the upper side of each of these rolls and passed forwardly and downwardly over a tension roller 117 and thence into position to be engaged by a paper feeding and cutting mechanism which operates to feed the web of each roll downwardly intermittently and cuts the same into sheets of a length suitable for wrapping around four surfaces or sides of a slice of material as hereinbefore described.

In order to prevent the rolls of paper 113 from turning too rapidly and possibly overthrowing when the paper web is pulled therefrom, a brake device is provided which prevents such excess rotation and interference with the proper operation of the machine. This brake device preferably consists of a brake arm 118 which is pivoted at its lower end on the adjacent part of the main frame so as to swing in a vertical plane and bears at its free upper end on the upper portion of one of the paper rolls, as shown in Fig. 1, and thereby exerts sufficient pressure by gravity against this roll so as to operate as a retarder to prevent too free unwinding of the web from the roll. In order to prevent the downward pull on the lower front end of the web from tearing the same during the operation of feeding the paper from the roll to the wrapping mechanism a yielding tension device is provided for supporting the tension roll 117, which tension device preferably consists of an upright tension rod 119 which is guided for vertical movement on the upper part of the main frame and is provided at its upper end with a horizontal pin 120 upon which the roll 117 is pivoted, a tension spring 121 surrounding the tension rod 119 and bearing at its lower end against a shoulder 122 on the main frame, while its upper end bears against a pin 123 on the tension rod, which pin also bears against a shoulder on the upper part of the main frame and thereby limits the upward motion of the tension roller. When the lower front end of the web of paper is pulled downwardly suddenly the tension roller 117 yields as much as required to prevent tearing of the web but when the motion of the web has been started the tension roller is again elevated to its normal position under the action of the tension spring.

Inasmuch as the two mechanisms whereby the web of paper is simultaneously fed from the two rolls of paper to the two wrapping mechanisms are identical in construction so far as the main features are concerned, the following description of one of these mechanisms so far as it applies, may be taken as a description of both of these mechanisms.

Arranged on transversely opposite sides of a passageway 125 between the rear end of the receiver 86 and the upper part of the elevator well 71 are two feed belts 126 which are preferably of the chain type and which are so mounted that they provide inner vertical operative stretches which are adapted to be moved outwardly adjacent to opposite sides of the passage 125, and vertical inoperative stretches which move upwardly adjacent the opposite outer sides of the machine, each of these belts passing with its upper and lower turns around supporting sprocket wheels 127, 128 which are pivotally mounted on the adjacent parts of the main frame. These belts are caused to move intermittently in unison by motion which is transmitted thereto from the main driving shaft 42 by a train of transmitting gearing which is preferably constructed as follows:—

The numeral 129 represents an upright shaft journaled in suitable bearings on the front part of the machine and connected at its lower end with the driving shaft 42 with intermittent driving gears 130, 131, as shown in Figs. 1 and 3. Arranged transversely and horizontally above the upright shaft 129 is a horizontal intermediate shaft 132 which is journaled on the adjacent part of the main frame and connected by a pair of bevel gears 133, 134 with the upper end of the upright shaft 129, as shown in Figs. 2 and 3. Each of the lower sprocket wheels 128 is mounted on the rear of a longitudinal shaft 135 which latter is operatively connected at its rear end with the adjacent part of the horizontal shaft 132 by means of a pair of miter gears 136, 137, as shown in Figs. 1, 2 and 4. By means of this mechanism the two paper feed chains 126 are caused to move downwardly with their operative inner stretches a distance equal the length of the sheet or strip of paper which is adapted to be wound around the slices of material and then remain at rest until this strip has been severed and wrapped around the slice of material, which operations occur during one rotation of the main driving shaft 42. The lower front end of each web is caused to move downwardly with the adjacent operative stretch of a paper feed belt by means of a plurality of grippers which are mounted at intervals on the respective feed belt and spaced at intervals thereon equal the length of a sheet or strip of paper which is to be wrapped around a slice of material. Each of these grippers projects laterally from this feed belt and is adapted to engage the outer edge of the respective web of paper while the gripper is near the upper end of the operative stretch of the belt and remains attached thereto until the gripper reaches the lower end of the operative stretch and is then released so that the web of paper is left in a position to be cut into proper length of sheet, and the gripper is free to return idly upward with the inoperative stretch of the belt to the place of beginning the next feeding action.

Each of these grippers in its preferred form, as best shown in Figs. 6, 7, 8, 9, 20, 22 and 23 comprises a carrier 138 which is mounted on one of the links of the feed belt 124 and is adapted to slide at its opposite edges in a pair of vertical tracks or guideways 139, 140 which are mounted on the main frame adjacent to one side of the passageway 125, a relatively fixed front gripper jaw 141 projecting laterally from the carrier 138 and having a gripping face on its rear side, a movable rear gripping jaw 142 arranged in rear of each stationary jaw 141 and journaled in a bearing 143 of the carrier 138 and made cam shape in cross section so as to provide a high gripping face 144 and a low releasing face 145 on its periphery so that by turning this movable jaw about its axis either its low face may be presented to the fixed gripping jaw 141 to release the paper which is arranged between these jaws as shown in Figs. 8 and 22, or to move the high face of the movable jaw opposite the fixed jaw for the purpose of gripping this sheet therebetween, as shown in Figs. 9 and 23.

This turning motion of the movable jaw of each gripper is effected by means of two tappets 146, 147 projecting forwardly and rearwardly from the inner part of the movable gripper jaw 142. As each gripper passes with its feed belt inwardly over the top of the upper supporting wheel 127 the same is open and as it begins its downward movement to the upper portion of the operative stretch of this belt these jaws move downwardly along opposite sides of the adjacent outer edge of the respective web of paper and under normal conditions the movable jaw of the gripper at this time is turned in a direction for presenting its high face to the companion stationary jaw and gripping the paper therebetween. The rotation of the movable jaw at this time is effected by its front tappet 146 engaging with a closing trip member 148 which at this time is arranged in the path of the front tappet 146 and therefore compels this tappet to be moved upwardly in order to clear the trip member 148 and thereby produce a rotary motion of the jaw 142 which operates to close the same and grip the adjacent edge portion of the sheet of paper. This gripper engages with the web of paper at the front end of the sheet or strip which is adapted to be severed from the web and wrapped around the next following slice or piece of material and the engagement of this gripper with the web is effected while the same is arranged at a predetermined distance above the receiver 86 in order to leave a length of the web below this gripper which will extend vertically across the rear end of the receiver 86 and a sufficient extent above and below the receiver to form a sheet which can be wrapped around the slice of material in the manner previously described. After the gripper has thus engaged with the edge of the web at a distance above the receiver 86 the same comes to rest and immediately thereafter the web is severed below the gripper which has just taken hold of the web so as to detach a sheet from the advancing end of the web and permit the same to be wrapped around a slice of material by means of the wrapping mechanism. After the preceding severed sheet has been wrapped around a slice of material and the plunger 87 has been retracted so as to clear the passage 125, the feed belt is again moved forwardly one step so as to carry the active gripper which is now in engagement with the edge of the web of paper downwardly to the lower part of the operative stretch of the feed belt at which point another length of paper has been fed so as to extend across the receiver 86 and project a sufficient distance below and above the same to form another sheet which is to be subsequently wrapped around the next following slice of material. After the web has been thus fed down another length in the manner described, the gripper is released from the lower or advancing edge of the web and then the feed belt is moved forwardly another step so that the lowermost gripper which is now open is carried away from the web and moved downwardly and outwardly around the respective lower supporting wheel 128 and then upwardly with the inoperative stretch of the feed belt preparatory to being again moved into its operative position for again engaging the web and advancing the same another step.

This opening of the gripper is effected by the rear tappet 147 thereof engaging an opening trip member 149 which is arranged in the path of the opening tappet 147 (see Figure 20) so that as the gripper effects the last part of its downward movement with the operative stretch of the feed belt, this tappet 147 will engage the opening trip member 149 and be turned from its lower position, as shown in Fig. 23 to its upper position as shown in Fig. 22, in order to clear the trip member 149. It will therefore be apparent that when the gripper is in open position its closing tappet 146 is intercepted by the closing trip member 148, while the opening tappet 147 is in operative position relative to the opening trip member 149, but when the closing tappet 146 is shifted into its upper position from which it clears the closing trip member 148, then the opening tappet 147 will be moved downwardly into a position in which it will engage the opening trip member 149 during its continued movement, thereby causing the gripper to be automatically closed upon the sheet while the same straddles the edge of the sheet at the beginning of an operative stroke, and to be opened for releasing the sheet at the end of an operative stroke of the gripper.

Means are provided whereby the paper feed mechanism will be maintained in an inoperative condition and not effect a forward feed of paper to the folding position in case the machine is operated when no pieces or slices of material are passed through the machine for the wrapping mechanism to operate upon. This condition will occur when the block or slab of material on the feed table has not been moved forwardly far enough to cut a slice therefrom which can be elevated into position for being subsequently pushed by the plunger 87 against a sheet which closes the receiver 86. The means which are provided for thus automatically controlling the feeding of the paper depending on the absence or presence of a slice of material in the proper position to be wrapped is constructed as follows:—

The numerals 150 represent rock shafts which are journaled horizontally and transversely in bars 151 mounted on a suitable stationary part of the machine, for example on the upper part of the front guide rails 140 for the paper feed belt 126, as shown in Figs. 3, 6, 7, 8, 20 and 21, so that by rocking each of the shafts 150 the respective closing trip member or finger may be moved into and out of the path of the closing tappets 146 of the respective grippers. Above the front or delivery end of the feed table 31 is arranged a deflector plate 152 which in the absence of a slab or block of material is adapted to project downwardly into the path of this block but which is adapted to be pushed upwardly out of this path by the block of material as the front end of the same is moved fully forward into a position in which its front end is flush with the front end of the feed table 31, which movement of the deflector is utilized to control the position of the closing trip member 148 accordingly.

This deflector is preferably pivoted at its rear end by means of a pin 153 on a stationary part of the main frame arranged immediately above the path of the block of material and the same is adapted to be depressed by gravity aided by a spring 154 which is secured to the adjacent part of the main frame and bears against the upper side of the deflector. Motion is transmitted from this deflector by a shifting rod 155 which is pivotally connected at its lower end with an upwardly projecting lug 156 on the upper side of the deflector while its upper end is connected with a rock arm 157 on the opposite end of the rock shaft 150, which carries the movable or closing trip member 148. When the front end of the block of material is not flush with the front end of the feed table or substantially so, then the deflector 152 will project downwardly into the path of the block of material, as shown by dotted lines in Fig. 20, whereby the closing trip member 148 will be moved downwardly and outwardly away from the path of the closing tappet 146 of the grippers and thereby avoid closing this gripper so that the same will effect its downward working stroke from a position above the receiver 86 to a position below the same without carrying any paper across the inlet of the receiver. When, however, the block of material has been advanced on the feed table sufficiently far to bring its front end flush with the front end of the table or substantially so, then the deflector 152 will be shifted by the block of material into its elevated position as shown by full lines in Fig. 20, whereby the closing trip member 148 will be moved inwardly and upwardly into a position in which it will intercept the closing tappet 146 of the gripper and thus the same will be closed for gripping a web of paper so that during the subsequent stroke of the paper feed mechanism a sheet or strip of the web will be moved downwardly across the inlet of the receiver 86 into a proper position for wrapping the same around the next following slice of material.

In the absence of this automatic controlling device which would permit a continuous feed of paper regardless of whether the slices of material were presented to the wrapping mechanism the machine would become clogged with paper and necessitate not only an interruption in the working of the machine for clearing the same but also occasioning a loss of time and waste of material.

While the web is momentarily at rest after the front end of the same has been moved downwardly one step for carrying the foremost length across the inlet of the receiver 86 and before the sheet has been released and operated upon by the folding and wrapping mechanism, this foremost length of sheet is severed from the remaining portions of the web immediately below the point where the next length of web is grasped by the next following gripper. The cutting mechanism whereby this is effected is best shown in Figs. 1, 2 and 3 and is constructed as follows:—

The numeral 158 represents an upper stationary cutter blade which is arranged horizontally and transversely in rear of the path of the wrapping paper adjacent to the operative stretch of the respective paper feeding belt and mounted in any suitable manner on an adjacent part of the main frame. Turning in a horizontal plane and cooperating with the front edge of the stationary blade 158 is a movable cutter blade 159 which is pivoted at its outer end on a pivot pin 160 which is supported on the stationary blade 158, this pivoted blade being held yieldingly in contact with the companion stationary blade by means of a spring 161 bearing at its lower end against a shoulder 162 on the main frame and at its upper end against the hub of the swinging blade, as best shown in Fig. 3. When the two cutter blades 158, 159 are separated a passageway is formed between them through which the web of paper is carried by the grippers of the respective paper feeding mechanism and after the web has been fed downwardly a requisite length and has come to rest then the movable cutter blade 159 is moved backwardly across the companion stationary blade 158 thereby producing a shearing cut upon the web of paper between the same which operates to sever the advancing length of the web which is to be used for wrapping a slice of material from the remaining body portion of the web. Motion for swinging this movable cutter blade 159 backwardly and forwardly for cutting the sheet of paper and then again clearing the path of the web is derived from the main driving shaft 42 by a train of gearing which is preferably constructed as follows:—

The numeral 163 represents a horizontal rock shaft which is journaled transversely in suitable bearings on the main frame. On its central part this shaft is provided with a downwardly projecting rock arm 164 which engages with a cam 165 secured to the upright shaft 129, as shown in Figs. 1 and 2. At opposite ends this rock shaft 163 is provided with upwardly projecting rock arms 166, each of which is connected at its upper end by means of a link 167 with an inwardly projecting rock arm 168 on the hub of one of the lower cutter blades 159, as shown in Figs. 1, 2 and 3. As the cam 165 rotates intermittently due to the action of the mutilated gears 130, 131, this motion transmitting mechanism operates the paper cutting mechanism once during each cycle of operations for severing the sheet of paper from the web which is to be used for wrapping a slice of material.

If no paper is fed forward to the wrapping position due to the block of material not being advanced to the proper position on the feed table then the paper cutter mechanism performs an idle operation which is without effect.

Inasmuch as the upper end of the sheet of material which has been severed from the web is liable to fall down and double up into a more or less irregular condition which would interfere with the proper wrapping of the same around a slice of material, means are provided for retaining the upper part of the sheet of paper in its proper position relative to the folding mechanism until it is engaged by the front side of the slice of material which is to be wrapped and under the control of the folding mechanism.

Preferred means for this purpose comprise a detent device consisting of a plurality of detent fingers 169 of spring metal, the lower ends of which are adapted to move forwardly and backwardly toward the rear side of the upper folding blade 101 for the purpose of clamping the upper part of the sheet of paper against the same, or releasing it, a horizontal rock shaft 170 carrying the upper ends of the detent fingers 169 and journaled in suitable bearings 171 on the main frame above the plunger 87, a retracting arm 172 projecting downwardly from the rock shaft 170 and adapted to engage the rear side of the plunger 87, and a spring 173 interposed between the upper rear side of the retracting arm 172 and the adjacent part of the main frame, and operating to move the arm 172, rock shaft 170 and fingers 169 forwardly toward the upper folding blade 101. When the plunger 87 is in its retracted position the same moves the retracting arm 172 backwardly together with the detent fingers 169 so that a clear path is formed between these detent fingers and the upper folding blade 101 through which the web of paper and the grippers adapted to engage the same can pass freely.

During the first part of the forward movement of the plunger 87 which is timed to occur just before the movable blade 159 cooperates with the stationary blade 158 for severing the foremost sheet from the body of the web, the plunger 87 permits the retracting arm 172 to move forwardly from the position shown by full lines in Fig. 19, to a position shown by dotted lines in the same figure, whereby the gripping fingers 169 are permitted to move forwardly to a position shown by full lines in Fig. 19 to a position shown by dotted lines in the same figure in which last mentioned position the gripping fingers engage with the rear side of the upper part of the web of paper and clamp the same against the rear side of the upper folding blade 101. Immediately thereafter the operation of severing the sheet from the web by the action of the blades 158, 159 is effected but the sheet will be prevented from dropping and assuming a more or less crumpled position at this time, inasmuch as it is securely clamped adjacent to its upper end against the upper folding blade 101. The upper part of the sheet is however easily withdrawn from between the detent fingers 169 and the upper folding blade 101 as the central part of the sheet is engaged by the front side of the slice of material, which latter is pushed forwardly during the continued forward movement of the plunger 87 after the latter has permitted the detent fingers 169 to engage the upper folding blade. During the downward movement of the upper folding blade 101 for effecting the preliminary crease in the upper flap of the sheet, as shown in Fig. 16, the upper blade simply slides in contact with the detent fingers 169 and also rises into its elevated position for the purpose of clearing the rear or inlet end of the receiver 86 without any objectionable effect.

During the backward or return movement of the plunger 87 the same again engages the lower end of the retracting arm 172 and moves the detent fingers 169 rearwardly out of the path of the web of paper and the fingers of the feeding mechanism.

It will be apparent from the foregoing description that by the use of this machine a large quantity of material which is usually manufactured in blocks or slabs such as icecream can be cut up and wrapped economically and expeditiously with no waste of materials, thereby enabling goods of this character to be marketed at comparatively low cost and also in the most sanitary manner.

I claim as my invention:

1. A machine of the character described, comprising means for presenting sections of material, means for feeding a wrapper sheet along one side of said section, a plunger arranged on the opposite side of said section and adapted to push the front side of the same against a wrapper sheet, means for folding said wrapper sheet around said section, and means for holding said wrapper sheet in place preparatory to engaging the same by said section, comprising a detent adapted to press one end of said wrapper sheet against one of said folding blades, a rock shaft carrying said detent, a spring for moving said detent toward the respective folding blades, and a retracting arm which is connected with said shaft and which is adapted to be engaged by said plunger during the backward movement of the latter for disengaging the detent from the respective folding blade.

2. A machine of the character described, comprising a plunger for pressing a section of material to be wrapped against a wrapper sheet, means for folding said wrapper sheet around said section, a detent for temporarily holding said sheet against one part of said folding means, and means actuated by said plunger to control the operation of said detent.

3. A machine of the character described, comprising a plunger for pressing a section of material to be wrapped against a wrapper sheet, means for folding said wrapper sheet around said section, a detent adapted to press one end of said wrapper sheet against a part of said folding means to temporarily hold the same, a spring for moving said detent toward said part, and a retracting arm operated by said plunger during its backward movement to disengage said detent from said part.

4. A machine of the character described, comprising mechanism for feeding the end of a web of wrapping material wound in a roll into position for folding about a section of material to be wrapped, cutting blades for severing a wrapper from said end, folding blades operative to engage said severed wrapper to fold portions of the same about a section of material, and yielding means cooperating with one of said folding blades to engage said web to hold the same while said cutting blades are severing said wrapper from said web.

5. A machine of the character described, comprising mechanism for feeding the end of a web of wrapping material wound in a roll into position for holding about a section of material to be wrapped, cutting blades for severing a wrapper from said end, cooperating folding members and blades for engaging said severed wrapper to fold the same about a section of material, yielding means cooperating with one of said folding blades to engage said web to hold the same while said cutting blades are severing said wrapper from said web, and means actuated by one of said folding members to throw said yielding means out of operative engagement with said folding blade.

6. A machine of the character described, comprising a plunger for pressing a section of material to be wrapped against a wrapper sheet, means for advancing the wrapper ends around said section including the rear face thereof, means for stopping said advancing movement when said plunger-engaged face is partially covered by said wrapper and after an interval continuing said movement, and means for withdrawing said plunger during said interval.

7. A machine of the character described, comprising a plunger for pressing a section of material to be wrapped against a wrapper sheet; means, including folding blades, for folding said wrapper sheet about said section, said blades operating to fold the ends of the wrapper sheet over the rear surface of said section; means for interrupting the folding movement of said blades for an interval and then continuing the same; and means operative during said interval to withdraw said plunger from engagement with said section.

8. A machine of the character described, comprising a plunger for pressing a section of material to be wrapped against a wrapper sheet, guides for folding said wrapper sheet against opposite ends of said section as the front side of the same is pushed against said sheet, folding blades adapted to engage with the end portion of said wrapper sheet and fold the same against the rear side of said section, means for at first advancing said blades only enough to firmly hold said section against withdrawal by said plunger upon its return movement, and then after an interval advancing said blades throughout the balance of their folding movement; and means to withdraw said plunger from engagement with said section during said interval.

9. A machine of the character described, comprising a plunger for pressing a section of material to be wrapped against a wrapper sheet, a tubular receiver into which said partially wrapped section is advanced by said plunger, vertically movable folding blades operative to engage the wrapper sheet to fold portions of the same over the rear of the section of material, a detent for temporarily holding the wrapper sheet against the upper one of said folding blades in the path of travel of said plunger, and means actuated by said plunger to control the operation of said detent.

10. A machine of the character described, comprising a plunger for pressing a section of material to be wrapped against a wrapper sheet, means for folding said wrapper sheet around said section, said means including vertically movable folding blades movable toward and from each other, a detent for temporarily holding the wrapper sheet against the upper one of said blades, and means operative in response to the movements of said plunger to control the operation of said detent.

11. A machine of the character described, comprising a horizontally moving plunger for advancing sections of material to be wrapped, a tubular receiver into which said sections are advanced by said plunger, vertically movable folding blades at the entrance of said receiver, said receiver, blades and plunger cooperating to fold a suspended wrapper sheet about a section of material, means for supporting a web of material on a roll above said receiver and plunger, feeding mechanism for drawing downward on the end of the web to bring the lower edge of the same below said receiver, a cutter mechanism above said receiver for severing a wrapper sheet from the end of the web prior to its being engaged by a section of material, and means cooperating with one of said folding blades to hold each severed wrapper sheet suspended in folding position at the entrance to said receiver.

12. A machine of the character described, comprising a horizontally movable plunger for advancing sections of material to be wrapped, a horizontally extending tubular receiver in which said sections are advanced by said plunger, means cooperating with said receiver to fold wrapper sheets around said sections, means for supplying wrapper sheets from above by pulling downward on the end of a web wound upon a roll, means for cutting off wrapper sheets successively from the end of the web, the cutting occurring in each instance prior to the first engagement of the section with the sheet, and means cooperating with said folding means to hold successively severed wrapper sheets in position at the entrance to said tubular receiver to be engaged each by a section of material advanced by said plunger.

13. A machine of the character described, comprising a plunger for pressing a section of material to be wrapped against a wrapper sheet, a tubular receiver into which said partially wrapped section is advanced by said plunger, vertically movable folding blades operative to engage the wrapper sheet to fold portions of the same over the rear of the section of material, a detent adapted to press one end of said wrapper sheet against the upper one of said folding blades to temporarily hold the same, a spring for moving said detent toward said upper folding blade, and a retracting arm operated by said plunger during its backward movement to disengage said detent from said upper folding blade.

14. A machine of the character described, comprising a plunger for pressing a section of material to be wrapped against a wrapper sheet, means for folding said wrapper sheet around said section, said means including folding blades vertically movable toward and from each other, a detent adapted to press one end of said wrapper sheet against the upper one of said folding blades to temporarily hold the same, a spring for moving said detent toward said upper folding blade, and a retracting arm operated by said plunger during its backward movement to disengage said detent from said upper folding blade.

15. A machine of the character described, comprising mechanism for feeding the end of a web wrapping material wound on a roll into position for folding about a section of material to be wrapped, cutting blades for severing a wrapper from said end, a plunger for pressing said section against the severed wrapper, a tubular receiver into which the partially wrapped section is advanced by said plunger, folding blades operative to fold portions of the wrapper over said section, and yielding means cooperating with one of said folding blades to engage said web below said cutting blades to hold the portion of the web constituting said wrapper both before and after cutting.

16. A machine of the character described, comprising mechanism for feeding the end of a web of wrapping material wound on a roll into position for folding about a section of material to be wrapped, cutting blades for severing a wrapper from said end, a plunger for pressing said section against the severed wrapper, a tubular receiver into which the partially wrapped section is advanced by said plunger, folding blades operative to fold portions of the wrapper over said section, yielding means cooperating with one of said folding blades to engage said web below said cutting blades to hold the portion of the web constituting said wrapper both before and after cutting, and means actuated by said plunger during its return stroke to throw said yielding means out of operative engagement with said folding blade.

17. A machine of the character described, comprising a plunger for pressing a section of material to be wrapped against a wrapper sheet, a tubular receiver into which said partially wrapped section is advanced by said plunger, vertically movable folding blades operative to engage the wrapper sheet to fold portions of the same over the rear of the section of material, means for stopping the movement of said folding blades when said plunger engaged face is partially covered by said wrapper and after an interval continuing said movement, and means for withdrawing said plunger during said interval.

18. A machine of the character described, comprising means for presenting sections of material, means for feeding a wrapper sheet along one side of each said section, a plunger arranged on the opposite side of said section and adapted to push the front side of the same against a wrapper sheet, means for folding a wrapper sheet about said section, a detent for holding said sheet against one of the parts of said folding means, and means actuated by said plunger to control the operation of said detent.

19. A machine of the character described, comprising means for presenting sections of material, means for feeding a wrapper sheet along one side of each said section, a plunger arranged on the opposite side of said section and adapted to push the front side of the same against a wrapper sheet, means for folding a wrapper sheet about said section, a detent adapted to press one end of said wrapper sheet against a part of said folding means to temporarily hold the same, a spring for moving said detent toward said part, and a retracting arm operated by said plunger during its backward movement to disengage said detent from said part.

20. A machine of the character described, comprising movable means for horizontally advancing sections of material to be wrapped, a fixed receiver into which said sections are moved by said movable means, means cooperating with said receiver to fold wrapper sheets around said sections, means for supplying wrapper sheets from a web wound on a roll by pulling on the free end of the web, means for cutting off wrapper sheets successively from the end of the web, the cutting occurring in each instance prior to the first engagement of the section with the sheet, and means cooperating with said folding means to hold successively severed wrapper sheets in wrapping position at the entrance to said receiver to be engaged each by an advancing section of material.

In testimony whereof I hereby affix my signature.

EDWARD C. HEGG.

CERTIFICATE OF CORRECTION.

Patent No. 1,751,585.            Granted March 25, 1930, to

EDWARD C. HEGG.

It is hereby certified that error appears in the printed specification of the above numbered patent requiring correction as follows: Page 10, line 62, claim 5, for the word "holding" read "folding"; and that the said Letters Patent should be read with this correction therein that the same may conform to the record of the case in the Patent Office.

Signed and sealed this 22nd day of April, A. D. 1930.

(Seal)

M. J. Moore,
Acting Commissioner of Patents.